(12) United States Patent
Ichiryu et al.

(10) Patent No.: US 8,118,551 B2
(45) Date of Patent: Feb. 21, 2012

(54) CASING AND FLUID MACHINE

(75) Inventors: Taku Ichiryu, Hyogo (JP); Tadao Yashiki, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 790 days.

(21) Appl. No.: 12/279,222

(22) PCT Filed: Feb. 13, 2007

(86) PCT No.: PCT/JP2007/052496
§ 371 (c)(1),
(2), (4) Date: Aug. 13, 2008

(87) PCT Pub. No.: WO2007/094306
PCT Pub. Date: Aug. 23, 2007

(65) Prior Publication Data
US 2009/0202345 A1    Aug. 13, 2009

(30) Foreign Application Priority Data
Feb. 14, 2006    (JP) .................................. 2006-037084

(51) Int. Cl.
*F03D 11/00* (2006.01)
(52) U.S. Cl. .................................................. 415/215.1
(58) Field of Classification Search .................. 415/220, 415/168.1, 168.4, 214.1, 215.1; 138/170, 138/171, 163; 285/288.1–288.11
See application file for complete search history.

(56) References Cited

U.S. PATENT DOCUMENTS

| | | | | |
|---|---|---|---|---|
| 1,246,091 A | * | 11/1917 | Haller | 285/288.5 |
| 3,359,626 A | * | 12/1967 | Auld et al. | 228/178 |
| 4,815,650 A | * | 3/1989 | Reaux | 228/119 |
| 6,575,697 B1 | | 6/2003 | Arilla et al. | |

FOREIGN PATENT DOCUMENTS

| | | |
|---|---|---|
| JP | 50-153741 A | 12/1975 |
| JP | 55-60406 U | 4/1980 |
| JP | 57-58165 U | 4/1982 |
| JP | 57-120724 U | 7/1982 |
| JP | 57-212305 A | 12/1982 |
| JP | 59-43674 B2 | 10/1984 |
| JP | 61-192503 U | 11/1986 |
| JP | 2003-514182 A | 4/2003 |

OTHER PUBLICATIONS

International Search Report of PCT/JP2007/052496, date of mailing Apr. 24, 2007.

* cited by examiner

*Primary Examiner* — Ross Gushi
(74) *Attorney, Agent, or Firm* — Westerman, Hattori, Daniels & Adrian, LLP

(57) ABSTRACT

A casing includes an upper casing and a lower casing jointed in a dividable manner, and a sealing structure that suppresses outward leakage of gas from a joint area between the upper casing and the lower casing. The casing 1 also includes: an upper protruding element that protrudes from an outer circumference of the upper casing; a lower protruding element that protrudes from an outer circumference of the lower casing; and an intermediary member that is arranged on outer circumferences of the upper protruding element and the lower protruding element. The joint area between the upper casing and the lower casing is extended by the upper protruding element and the lower protruding element, and the intermediary member is welded to the upper protruding element and the lower protruding element, at a position offset from the joint area.

10 Claims, 5 Drawing Sheets

VIEW ACROSS LINE A-A

VIEW ACROSS LINE A-A

VIEW ACROSS LINE B

CASING AND FLUID MACHINE

TECHNICAL FIELD

The present invention relates to a casing and a fluid machine, and more particularly, to a casing that has a dividable structure and can suppress outward gas leakage from a joint area of flange surfaces, and to a fluid machine provided with the casing.

BACKGROUND ART

In a casing used for a cylinder of a turbine or a compressor, a dividable structure is generally adopted. Such a casing is presented with a challenge that the outward gas leakage must be suppressed at the flange surface. Particularly, if helium gas is used as working gas, not only the leakage tends to occur much easier than other gas, such as steam, but also it is more expensive. Therefore, in a fluid machine (turbine or compressor) using high-pressure helium gas as working gas, there has been a demand for suppressing the leakage of the working gas more effectively. Therefore, in a known casing, various types of sealing structures are used for the flange section.

One of the known casings (a sealing structure for the flange section of a pressure container) is disclosed in Patent Document 1. In flanges of a pressure container of the known casing for enclosing cover gas, including sodium or sodium mist, a ring element, having an I-shaped cross section, is provided onto the entire circumference of the flange. In this manner, the ring element protrudes inwardly from a bolt attaching portion of one of the flanges, which are joined together by flange bolts, into an inter-space between the flanges. At the same time, the other flange includes a ring element, having a J-shaped cross section, on the entire circumference thereof along the former ring element. The edges of these ring elements are engaged and welded together to form a U-shaped sealing element for sealing the cover gas, including the sodium or the sodium mist, inside the container.

[Patent Document 1] Japanese Patent Application Laid Open No. S55-17712

DISCLOSURE OF INVENTION

Problem to be Solved by the Invention

An object of the present invention is to provide a casing that has a dividable structure and can prevent the gas from leaking from the joint area of the flange surfaces, and to provide a fluid machine provided with such a casing.

Means for Solving Problem

According to an aspect of the present invention, a casing having an upper casing and a lower casing that are joined together in a dividable manner, and a sealing structure that prevents outward leakage of gas from a joint area between the upper casing and the lower casing comprises: an upper protruding element that protrudes from an outer circumference of the upper casing; a lower protruding element that protrudes from an outer circumference of the lower casing; and an intermediary member that is arranged on the outer circumferences of the upper protruding element and the lower protruding element. The joint area between the upper casing and the lower casing is extended by the upper protruding element and the lower protruding element; and the intermediary member is welded to the upper protruding element and the lower protruding element, at a position offset from the joint area.

In this casing, because the upper casing (upper protruding element) and the lower casing (lower protruding element) are welded together by way of the intermediary member, no trace of the weld remains on the joint area between the flange surfaces when the casing is divided. Therefore, upon assembling the casing again, the remaining welds do not get in the way. In this manner, the upper casing and the lower casing can be held in contact appropriately at the flange surfaces. In this manner, advantageously, the joint area is better sealed, effectively suppressing the outward leakage of the gas.

In the casing according to the present invention, the intermediary member may seal an outer circumference of the joint area that is extended by the upper protruding element and the lower protruding element.

In the casing, because the intermediary member seals the outer circumference of the joint area that is extended by the upper protruding element and the lower protruding element, the joint area can be advantageously better sealed, enabling to suppress the outward leakage of the gas more effectively.

In the casing according to the present invention, each of the upper protruding element and the lower protruding element may have a flexible structure that is deformable with the intermediary member being welded.

In this casing, because the upper protruding element and the lower protruding element have flexible structures, when the upper casing and the lower casing deform, these elements follow the deformation. Therefore, the joined flange surfaces are maintained. In this manner, the joint area can be sealed reliably, advantageously suppressing the outward leakage of the gas more effectively.

In the casing according to the present invention, the flexible structure may include a concaving portion formed along extending directions of the upper protruding element and the lower protruding element.

In this arrangement, when the upper casing and the lower casing deform, the upper protruding element and the lower protruding element make flexible deformation originating from the concaving portions. In this manner, the joint between the flange surfaces is advantageously maintained, ensuring the sealing of the joint area, thus suppressing outwardly gas leakage effectively.

In the casing according to the present invention, the intermediary member may be provided in a divided manner along the extending directions of the upper protruding element and the lower protruding element.

In this casing, because the intermediary member is arranged in a divided manner, the intermediary members can be attached more easily, compared with a long intermediary member provided in a singularity.

In the casing according to the present invention, a groove may be formed on the joint area of the upper casing and the lower casing along an extending direction of the upper casing and the lower casing.

In this arrangement, the deformation of the flange elements, caused by thermal stress generated upon welding the intermediary members, is absorbed by the grooves. In this manner, the distortion of the joint area between the upper casing and the lower casing is reduced, ensuring the joint area to be better sealed. Therefore, advantageously, the outward gas leakage can be suppressed effectively.

The casing according to the present invention may further comprise a pressing member that presses the intermediary member against the upper protruding element and the lower protruding element.

Because, in this arrangement, the intermediary member is pressed against and brought in contact with the upper protruding element and the lower protruding element by way of the pressing member, the joint area can be better sealed by the intermediary member.

The casing according to the present invention may further comprise: a groove that is formed on the joint area between the upper casing and the lower casing; and a gas collection channel that is connected to the groove.

In this casing, because the gas leaked to the joint area from the casing travels through the groove provided on the joint area, and is collected through the collecting channels. In this manner, the outward leakage of the gas can be advantageously suppressed.

In the casing according to the present invention, the pressure in the collection channel may be negative with respect to that in the casing.

In this casing, because the pressure in the collecting channels is negative with respect to that in the casing, the gas in the groove is actively led into the collecting channels. In this manner, advantageously, the gas can be collected effectively.

According to another aspect of the present invention, a casing having an upper casing and a lower casing that are joined together in a dividable manner, and a sealing structure that prevents outward leakage of gas from a joint area between the upper casing and the lower casing comprises: a groove that is formed on the joint area between the upper casing and the lower casing; and a gas collection channel that is connected to the groove.

In this casing, because the gas leaked to the joint area from the casing travels through the groove provided on the joint area, and is collected through the collecting channels. In this manner, the outward leakage of the gas can be advantageously suppressed.

According to still another aspect of the present invention, a fluid machine has a cylinder comprising the above described casing.

EFFECT OF THE INVENTION

In the casing according to the present invention, because the upper casing and the lower casing are welded together by way of the intermediary member, no trace of the weld remains on the joint area between the flange surfaces when the casing is divided. Therefore, upon assembling the casing again, the remaining welds do not get in the way. In this manner, the upper casing and the lower casing can be held in contact appropriately at the flange surfaces. In this manner, advantageously, the joint area P is better sealed, effectively suppressing the outward leakage of the gas.

EXPLANATIONS OF LETTERS OR NUMERALS

Figure 1:
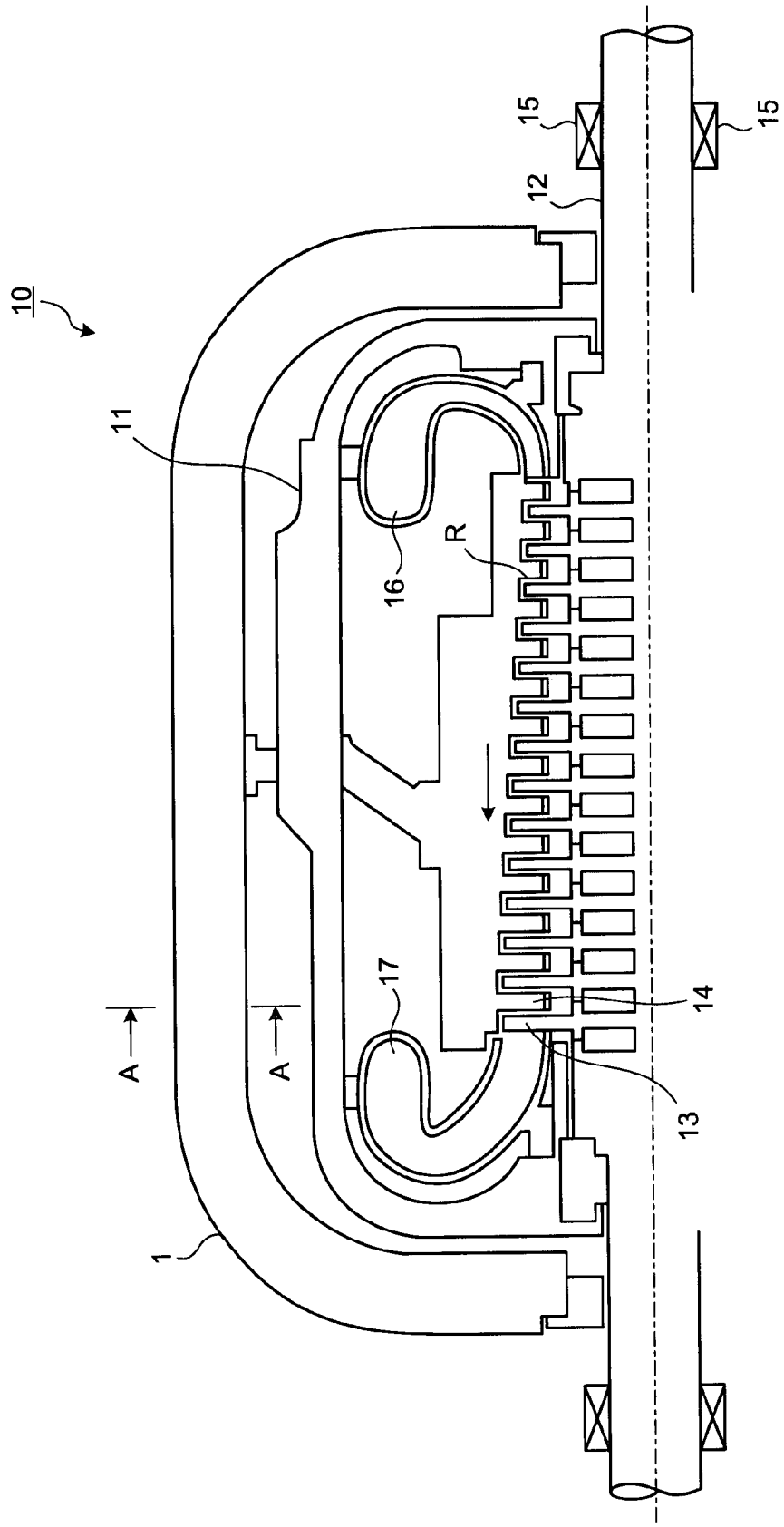
FIG. 1 is a structural diagram of an exemplary application of a casing according to an embodiment of the present invention.

1 casing
2 upper casing
21 flange element
22 upper protruding element
23 concaving portion
3 lower casing
31 flange element
32 lower protruding element
33 concaving portion
4 intermediary member
41 projecting element
42 gasket
5 groove
51 drilled hole
52 drilled hole
53 collecting pipe
61 bolt
62 nut
63 gasket
7 gasket
8 pressing member
9 gasket
10 turbine
11 inner casing
12 rotor
13 rotor vane
14 stator vane
15 bearings
16 inlet portion
17 outlet portion

BEST MODE(S) FOR CARRYING OUT THE INVENTION

The present invention will be now described in detail below, with reference to the drawings. It should be understood that these embodiments are not intended to limit the present invention in any way. Moreover, elements described in the embodiments shall include those that are easily replaceable by those in the art, or elements that are substantially the same as those described herein. A plurality of modifications of the present invention presented herein can be combined in any way within the scope that is obvious to those in the art.

[Embodiment]

Figure 2:
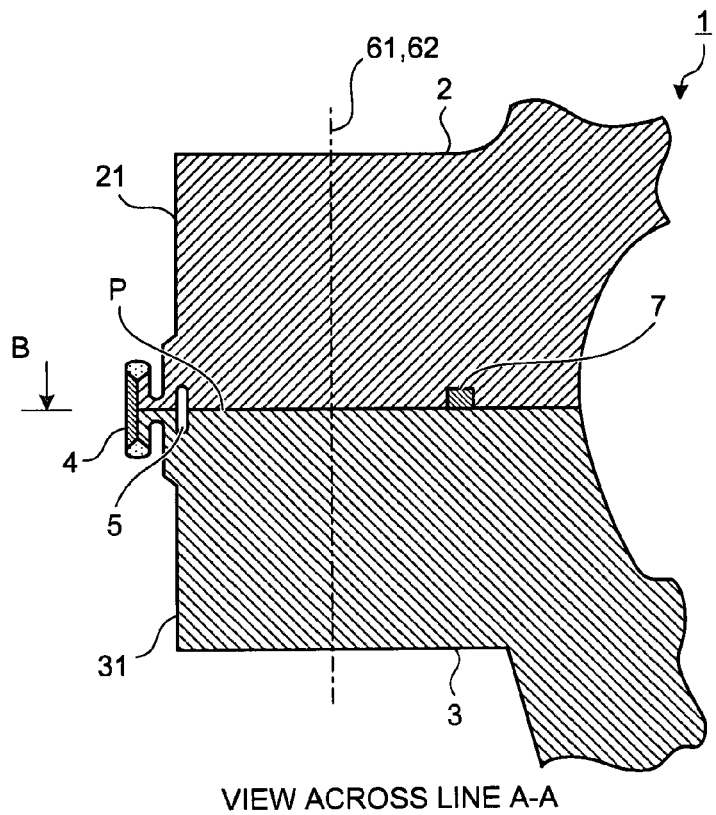
FIG. 2 is a cross-sectional view of the casing shown in FIG. 1 across a line A-A.
Figure 3:
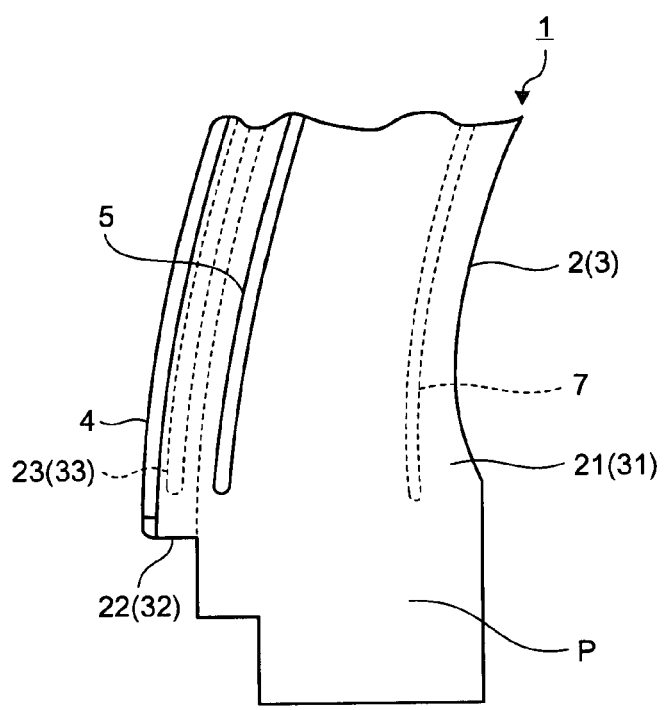
FIG. 3 is a cross-sectional view of the casing shown in FIG. 2 across a line B.
Figure 4:
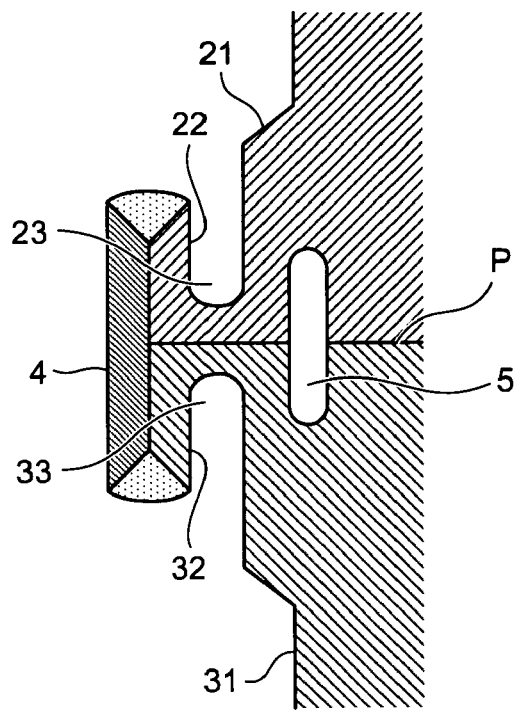
FIG. 4 is a cross-sectional view of a protruding element and an intermediary member of the casing shown in FIG. 2.
Figure 5:
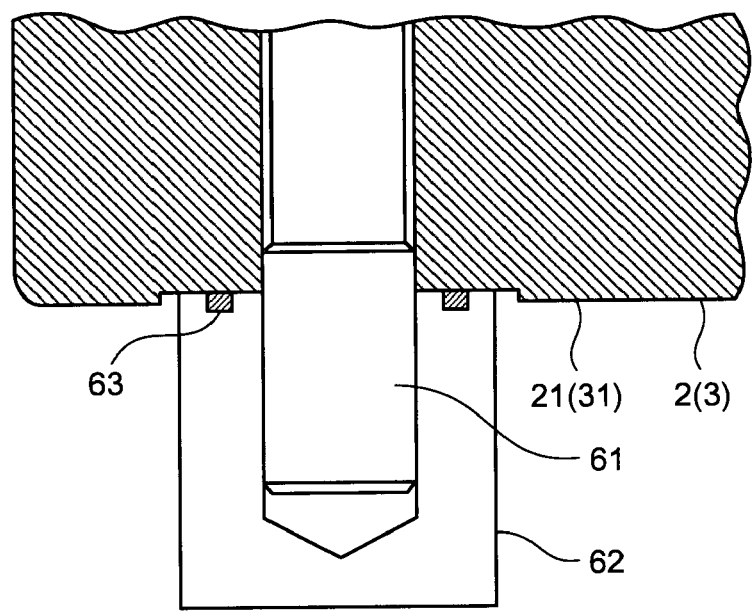
FIG. 5 is an illustrative diagram of a nut in the casing shown in FIG. 2.

FIG. 1 is a structural diagram of an exemplary application of a casing according to an embodiment of the present invention. FIG. 2 is a cross-sectional view of the casing shown in FIG. 1 across a line A-A. FIG. 3 is a cross-sectional view of the casing shown in FIG. 1 across a line B. FIG. 4 is a cross-sectional view of a protruding element and an intermediary member of the casing shown in FIG. 1. FIG. 5 is an illustrative diagram of a nut in the casing shown in FIG. 1. FIGS. 6 to 9 are illustrative diagrams of modifications of the casing shown in FIG. 2.

[Casing]

A casing 1 is characterized by its dividable structure, and its capability to suppress outward gas leakage from a joint area P of flange surfaces. The casing 1 is applied to cylinder flanges, for example, of a turbine or a compressor. In this embodiment, the casing 1 is described to be applied to cylinder flanges of a turbine 10.

The turbine 10 includes a casing (outer casing) 1 that makes up the cylinder flanges, an inner casing 11, a rotor 12, a plurality of rotor vanes 13, and a plurality of stator vanes 14 (see FIG. 1). The inner casing 11 is housed inside the casing 1. A channel R for working gas is provided in the inner casing 11. In this turbine 10, helium gas is used as the working gas. The rotor 12 is supported by bearings 15, 15 at both ends, and is arranged to penetrate through the casing 1 and the inner casing 11. The rotor vanes 13 and the stator vanes 14 are arranged in a staggered manner on an outer circumference of the rotor 12 in the axial direction to form a part of the channel R for the working gas. When the turbine 10 is operated, the high-temperature and high-pressure working gas is introduced to the channel R in the inner casing 11 from an inlet portion 16, and passes through the rotor vanes 13 and the stator vanes 14 while expanding in its volume. In this manner, the rotor 12 is rotated with the rotor vanes 13 to generate a driving force. The working gas, passing through the rotor vanes 13 and the stator vanes 14, will be collected to a collection line (not shown) via an outlet portion 17.

The casing 1 includes an upper casing 2 and a lower casing 3, and these are jointed together along a horizontal dividing surface (joint area P), in a dividable manner in upward and downward directions, to form the casing 1 (see FIG. 2). Specifically, a flange element 21 of the upper casing 2 and a flange element 31 of the lower casing 3 are jointed together, and fastened with a bolt 61 and a nut 62. On the flange surface of the upper casing 2, a metal gasket 7 is provided along the circumferential direction of the casing 1. The joint area P between the upper casing 2 and the lower casing 3 is sealed by this gasket 7 and a surface contact between the flange elements 21, 31 facing each other (sealing structure). In this manner, the gas leakage from the joint area P between the flange surfaces is suppressed. On the flange surfaces of the upper casing 2 and the lower casing 3, it is preferable to provide a machine finish of approximately Ra 3.2 to Ra 1.6. In this manner, the surface contact between the flange elements 21, 31 is improved, further enabling the joint area P to be better sealed.

[Protruding Elements and Intermediary Member]

An upper protruding element 22 is provided on the flange element 21 of the upper casing 2, and a lower protruding element 32 is provided on the flange element 31 of the lower casing 3 (see FIGS. 2 to 4). The upper protruding element 22 and the lower protruding element 32 protrude from outer circumference surfaces of the upper casing 2 and the lower casing 3, respectively, toward the outside of the casing 1. The joint area P between the upper casing 2 and the lower casing 3 is extended outwardly from the casing 1 by way of the upper protruding element 22 and the lower protruding element 32. The upper protruding element 22 and the lower protruding element 32 are formed along the circumference of the flange surfaces P, approximately over the entire circumference of the casing 1.

An intermediary member (contact board) 4 is arranged in contact with the outer circumference of the upper protruding element 22 and the lower protruding element 32. This intermediary member 4 is a plate-shaped member, and arranged approximately over the entire circumference of the upper protruding element 22 and the lower protruding element 32. The intermediary member 4 is welded to the upper protruding element 22 and the lower protruding element 32, respectively, at a position offset from the joint area P of the flange surfaces. In other words, the upper protruding element 22 and the lower protruding element 32 are welded together by way of the intermediary member 4, and the contacting surface between the upper protruding element 22 and the lower protruding element 32 is not welded together. The intermediary member 4 is arranged on the outer circumference of the joint area P that is extended by the upper protruding element 22 and the lower protruding element 32, sealing the joint area P from the outer circumferential direction.

Upon maintaining the turbine 10, the bolt 61 and the nut 62 that fasten the upper casing 2 and the lower casing 3 together, are removed, the weld on the intermediary member 4 is scraped away, and the casing 1 is divided. Because, in the casing 1, the upper casing 2 (upper protruding element 22) and the lower casing 3 (lower protruding element 32) are welded together by way of the intermediary member 4 (see FIG. 4), no trace of the weld remains on the joint area P of the flange surfaces when the casing 1 is divided. Therefore, upon assembling the casing 1 again, the remaining welds do not get in the way. In this manner, the upper casing 2 and the lower casing 3 can be held in contact appropriately at the flange surfaces. In this manner, advantageously, the joint area P is better sealed, effectively suppressing the outward leakage of the gas.

Furthermore, according to this structure, the intermediary member 4 is welded to the upper protruding element 22 and the lower protruding element 32. Therefore, in comparison with a structure where the intermediary member 4 is directly welded to the circumferential surfaces of the upper casing 2 and the lower casing 3 (not shown), the welds on the intermediary member 4 can be advantageously removed and welded together again more easily.

Still furthermore, the structure can be achieved by providing small additional protruding elements (the upper protruding element 22 and the lower protruding element 32) onto a known casing. Still furthermore, the process applied to the flange surface P of the upper casing 2 and the flange surface of the lower casing 3 may be of a surface roughness approximately of the same level as that of the known casing. Still furthermore, welding of the intermediary member 4 is small; therefore, it is possible to reduce a maintenance period (overhauling period) and a labor cost required for the welding.

Still furthermore, in the casing 1, because the intermediary member 4 seals the outer circumference of the joint area P that is extended by the upper protruding element 22 and the lower protruding element 32 (see FIG. 4), the joint area P can be advantageously better sealed, enabling to suppress the outward leakage of the gas more effectively.

In the casing 1, it is also preferable for the upper protruding element 22 and the lower protruding element 32 that are welded with the intermediary member 4 to have flexible structures, so that they can be deformed (see FIGS. 2 and 4). For example, if the casing 1 is used as a cylinder (pressure-resistant container) of the turbine 10, the casing 1 goes through a great change in internal pressure and temperature during the turbine operation. Then, the flange element 21 of the upper casing 2 and the flange element 31 of the lower casing 3, facing each other, are moved in relation to each other, thus deforming the joint area P between the flange surfaces. If the upper protruding element 22 and the lower protruding element 32 are flexible in structure, these elements follow the deformation, maintaining the joint between the flange surfaces. In this manner, the sealing at the joint area P is advantageously ensured, as well as the outward leakage of the gas is suppressed more effectively.

Still furthermore, in this arrangement, when the intermediary member 4 is welded together again, the upper protruding element 22 and the lower protruding element 32 deform flexibly, and release the deformation caused by thermal stress. Excessive residual stress due to welding decreases in turn, further reducing the deformation (hazardous deformation) at the joint area P between the upper casing 2 and the lower casing 3. In this manner, the sealing at the joint area P is advantageously ensured, as well as the outward leakage of the gas is suppressed more effectively.

For example, the flexible structures are provided as concaving portions 23, 33, respectively formed on the extending direction of the upper protruding element 22 and the lower protruding element 32 (see FIG. 4). Specifically, the upper protruding element 22 and lower protruding element 32 have L-shaped cross sections in the radial direction of the casing 1, and are curved (bent) approximately perpendicularly to the flange surfaces. The upper protruding element 22 and the lower protruding element 32 protrude from the outer circumference of the casing 1 in an approximate T shape along the flange surfaces P as a symmetric axis. The intermediary member 4 is brought in contact with the top portion of the T-shaped element. Both ends of the intermediary member 4 are welded to the upper protruding element 22 and the lower protruding element 32, respectively.

In this arrangement, when the upper casing 2 and the lower casing 3 deform, the upper protruding element 22 and the lower protruding element 32 make flexible deformation originating from the concaving portions 23, 33. In this manner, the joint between the flange surfaces is advantageously maintained, ensuring the sealing of the joint area P, thus suppressing outwardly gas leakage effectively.

[Modification 1]

In this casing 1, the upper casing 2 and the lower casing 3 are jointed together by the bolt 61 and the nut 62 at the flange elements 21, 31. Specifically, the bolt 61 penetrates through both of the flange elements 21, 31, and the nuts 62, 62 are screwed thereon to each end of the bolt 61. At this time, the nuts 62, 62 are brought in contact with the outer circumference surface of the flange elements 21, 31. In this arrangement, the gas may pass through the bolt holes provided on the flange element 21, 31, and leak outwardly from the casing 1 at the joint area P.

Therefore, in this casing 1, it is preferable to provide a sealing structure to the bolt 61 and the nuts 62 (see FIG. 5). For example, a metal gasket 63 is provided on a contact area between the nut 62 and the outer circumferential surface of each of the flange elements 21, 31 (contact surfaces of the nuts 62). This gasket 63 seals the gap between the nut 62 and each of the flange elements 21, 31. Advantageously in this manner, the outward gas leakage can be effectively reduced.

In this arrangement, it is also preferable to improve the surface contact (surface pressing pressure) between the nut 62 and each of the flange element 21, 31 by improving the surface roughness of the contact surface of the nut 62 and each of the flange elements 21, 31. In this manner, the gap between the nut 62 and each of the flange elements 21, 31 is sealed more reliably, thus advantageously suppressing the outward gas leakage more effectively.

Still furthermore, because, in the arrangement, the contact surface of the nut 62 is relatively small in radius and is circular in shape, an inexpensive gasket 9 can be used. Still furthermore, the contact surface of the nut 62 and each of the elements 21, 31 can be processed easily. Thus, the arrangement can be applied to an existing casing, advantageously.

[Modification 2]

Figure 6:
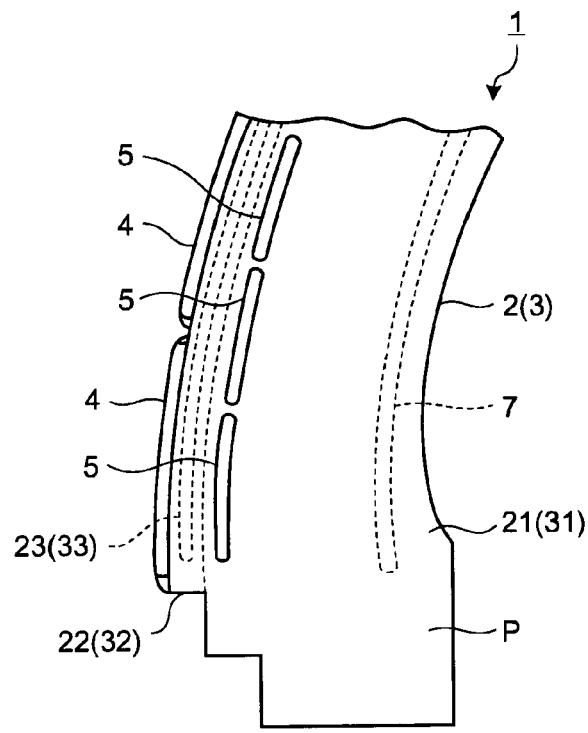
FIG. 6 is an illustrative diagram of a modification of the casing shown in FIG. 2.

In the casing 1, it is also preferable for the intermediary member 4 to be arranged in a dividable manner, in the extending direction of the upper protruding element 22 and the lower protruding element 32 (see FIG. 6). In other words, a plurality of intermediary members 4 are arranged along the upper protruding element 22 and the lower protruding element 32, and these intermediary members 4 seal the joint area P between the upper casing 2 and the lower casing 3.

In this arrangement, because the intermediary members 4 are arranged in a dividable manner, the intermediary members 4 can be advantageously mounted more easily, compared with the long intermediary member 4 arranged in singularity (see FIG. 2). In this arrangement, it is preferable to arrange the intermediary members 4 with a small inter-space (the inter-space between the adjacent intermediary members 4, 4) so that the joint area P is better sealed.

[Modification 3]

In the casing 1, it is also preferable for the upper casing 2 and the lower casing 3 to include a groove 5, respectively, on the joint area P (see FIGS. 2 to 4). These grooves 5 extend along the upper protruding element 22 and the lower protruding element 32 in the circumferential direction of the flange elements 21, 31. Moreover, the groove 5 is provided correspondingly to the welded area of the intermediary members 4. The groove 5 may be formed in plurality in a divided manner (see FIG. 6).

In this arrangement, the deformation of the flange elements 21, 31, caused by thermal stress generated upon welding the intermediary members 4, is absorbed by the grooves 5. In this manner, the distortion of the joint area P between the upper casing 2 and the lower casing 3 is reduced, ensuring the joint area P to be better sealed. Therefore, advantageously, the outward gas leakage can be suppressed effectively.

[Modification 4]

Figure 7:
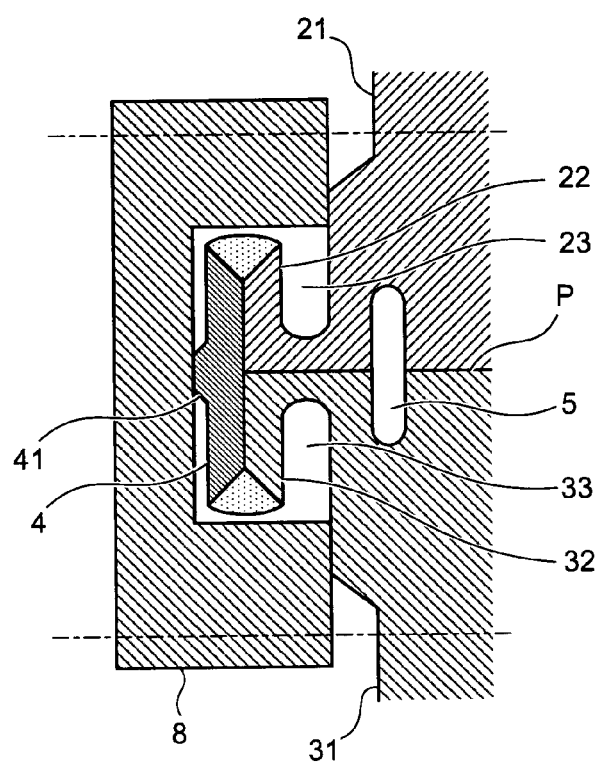
FIG. 7 is an illustrative diagram of another modification of the casing shown in FIG. 2.

In the casing 1, it is also preferable to include a pressing member (pressing plate) 8 that presses the intermediary member 4 against the upper protruding element 22 and the lower protruding element 32 (see FIG. 7). This pressing member 8 is made from a plate-like member having a U-shaped cross section, for example. The inner circumferential surface thereof is brought in contact with the intermediary member 4, and fixed against the upper casing 2 and the lower casing 3 with a bolt (not shown). The intermediary member 4 has a projecting element 41, and the pressing member 8 is brought in contact with this projecting element 41. In this manner, the intermediary member 4 is pressed reliably.

Because, in this arrangement, the intermediary member 4 is pressed against and brought in contact with the upper protruding element 22 and the lower protruding element 32 by way of the pressing member 8, the joint area P can be better sealed by the intermediary member 4. In this manner, the outward leakage of the gas can be advantageously suppressed effectively. Furthermore, the pressure capacity of the intermediary member 4 is enforced by the pressing member 8 that presses the intermediary member 4; thus, excessive deformation of the intermediary member 4 can be suppressed. In this manner, the joint area P becomes better sealed. P [Modification 5]

Figure 8:
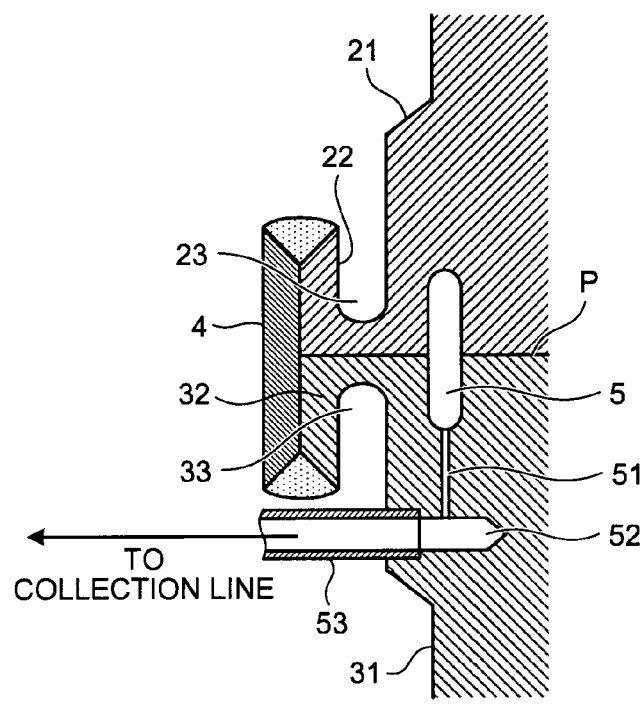
FIG. 8 is an illustrative diagram of still another modification of the casing shown in FIG. 2.

In the casing 1, it is also preferable to be formed with the groove (relief groove) 5 at the joint area P between the upper casing 2 and the lower casing 3, and collecting channels 51 to 53 that are to be connected to the groove 5 (see FIG. 8). In this arrangement, the gas leaked from the casing 1 through the joint area P travels into the groove 5 at the joint area P, and is collected through the collecting channels 51 to 53. In this manner, the outward gas leakage from the casing 1 can be advantageously suppressed. For example, an expensive working gas, such as helium gas, can be effectively collected advantageously.

For example, the long thin groove 5 is formed on the joint area P between the upper casing 2 and the lower casing 3 along the circumferential direction of the flange surfaces (see FIG. 3). The groove 5 is formed with a drilled hole 51 from the bottom thereof, and the drilled hole 51 is connected to a drilled hole 52 formed from the outer circumferential surface of the lower casing 3. The drilled hole 52 is installed with a collecting pipe 53 engaged therewith. The collecting pipe 53 is, in turn, connected to an external collection line (not shown). In this arrangement, the gas that enters the groove 5 from the joint area P, travels through the drilled hole 51 and the drilled hole 52, is collected via the collecting pipe 53, and is sent to the collection line.

In the arrangement, it is also preferable that the pressure in the collecting channels 51 to 53 (the collection line) to be negative with respect to an inside pressure of the casing 1 (groove 5). In this arrangement, the gas in the groove 5 is actively led into the collecting channels 51 to 53. Therefore, the gas can be effectively collected advantageously. Still furthermore, in this arrangement, because the pressure at the joint area P can be reduced at the same time, the structure of the intermediary member 4 may be less strong, advantageously. Still furthermore, because a reduced amount of the gas leaks out between the upper protruding element 22 and the lower protruding element 32, the surface roughness of an attachment surface of the intermediary member 4 (the contact surface of the intermediary member 4 against the upper protruding element 22 and the lower protruding element 32) can be advantageously reduced.

Figure 9:
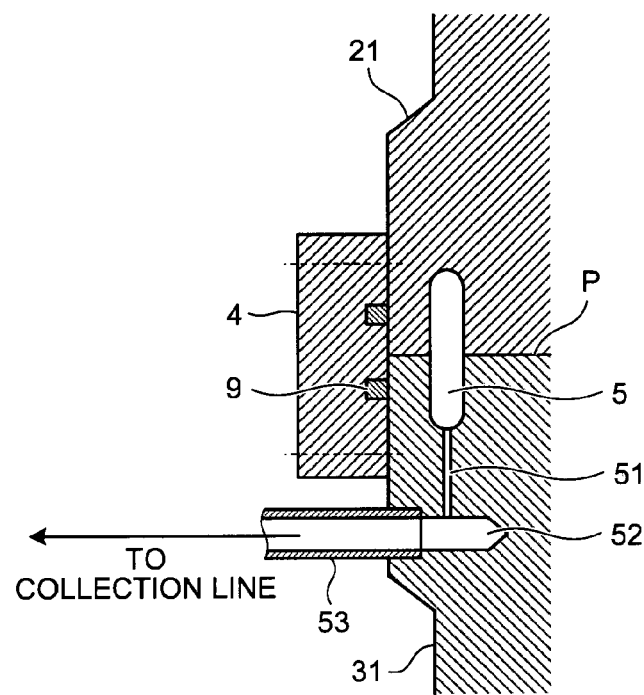
FIG. 9 is an illustrative diagram of still another modification of the casing shown in FIG. 2.

Still furthermore, in the arrangement, the upper protruding element 22 and the lower protruding element 32 can be omitted, and the intermediary member 4 can be directly attached onto the upper casing 2 and the lower casing 3 (see FIG. 9). For example, the intermediary member 4 is arranged so as to cover the outer circumference of the joint area P and to be brought in contact with the outer circumferential surface of the flange element 21 included in the upper casing 2 and the outer circumferential surface of the flange element 31 included in the lower casing 3, and fixed by a joint with a bolt. The attaching surface of the intermediary member 4 includes the gasket 9 made of a metal or a resin (e.g., polymer). This arrangement can also suppress outward leakage of the gas.

INDUSTRIAL APPLICABILITY

As described above, the casing (and the fluid machine with the casing) is useful because the casing has the dividable structure, as well as it can suppress outward leakage of the gas from the joint area of the flange surfaces.

The invention claimed:

1. A casing having an upper casing and a lower casing that are joined together in a dividable manner, and a sealing structure that prevents outward leakage of gas from a joint area between the upper casing and the lower casing, the casing comprising:
   an upper protruding element that protrudes from an outer circumference of the upper casing;
   a lower protruding element that protrudes from an outer circumference of the lower casing; and
   an intermediary member that is arranged on the outer circumferences of the upper protruding element and the lower protruding element, wherein
   the joint area between the upper casing and the lower casing is extended by the upper protruding element and the lower protruding element; and
   the intermediary member is welded to the upper protruding element and the lower protruding element, at a position offset from the joint area, the upper protruding element and the lower protruding element are welded with the intermediary member to have flexible structures, so that they can be deformed.

2. The casing according to claim 1, wherein the intermediary member seals an outer circumference of the joint area that is extended by the upper protruding element and the lower protruding element.

3. The casing according to claim 1, wherein the flexible structure includes a concaving portion formed along extending directions of the upper protruding element and the lower protruding element.

4. The casing according to claim 1, wherein the intermediary member is provided in a divided manner along the extending directions of the upper protruding element and the lower protruding element.

5. The casing according to claim 1, further comprising a pressing member that presses the intermediary member against the upper protruding element and the lower protruding element.

6. A fluid machine having a cylinder being adapted to a turbine or compressor, the fluid machine comprising the casing according to claim 1.

7. A casing having an upper casing and a lower casing that are joined together in a dividable manner, and a sealing structure that prevents outward leakage of gas from a joint area between the upper casing and the lower casing, the casing comprising:
   an upper protruding element that protrudes from an outer circumference of the upper casing;
   a lower protruding element that protrudes from an outer circumference of the lower casing; and
   an intermediary member that is arranged on the outer circumferences of the upper protruding element and the lower protruding element, wherein
   the joint area between the upper casing and the lower casing is extended by the upper protruding element and the lower protruding element; and
   the intermediary member is welded to the upper protruding element and the lower protruding element, at a position offset from the joint area, wherein a groove is formed on the joint area of the upper casing and the lower casing along an extending direction of the upper casing and the lower casing.

8. A casing having an upper casing and a lower casing that are joined together in a dividable manner, and a sealing structure that prevents outward leakage of gas from a joint area between the upper casing and the lower casing, the casing comprising:
   an upper protruding element that protrudes from an outer circumference of the upper casing;
   a lower protruding element that protrudes from an outer circumference of the lower casing; and
   an intermediary member that is arranged on the outer circumferences of the upper protruding element and the lower protruding element, wherein
   the joint area between the upper casing and the lower casing is extended by the upper protruding element and the lower protruding element; and
   the intermediary member is welded to the upper protruding element and the lower protruding element, at a position offset from the joint area, and further comprising:

a groove that is formed on the joint area between the upper casing and the lower casing; and
a gas collection channel that is connected to the groove.

9. The casing according to claim 8, wherein the pressure in the collection channel is negative with respect to that in the casing.

10. The casing according to claim 8, wherein
each of the upper protruding element and the lower protruding element has a flexible structure that is deformable with the intermediary member being welded.

* * * * *